Patented June 21, 1927.

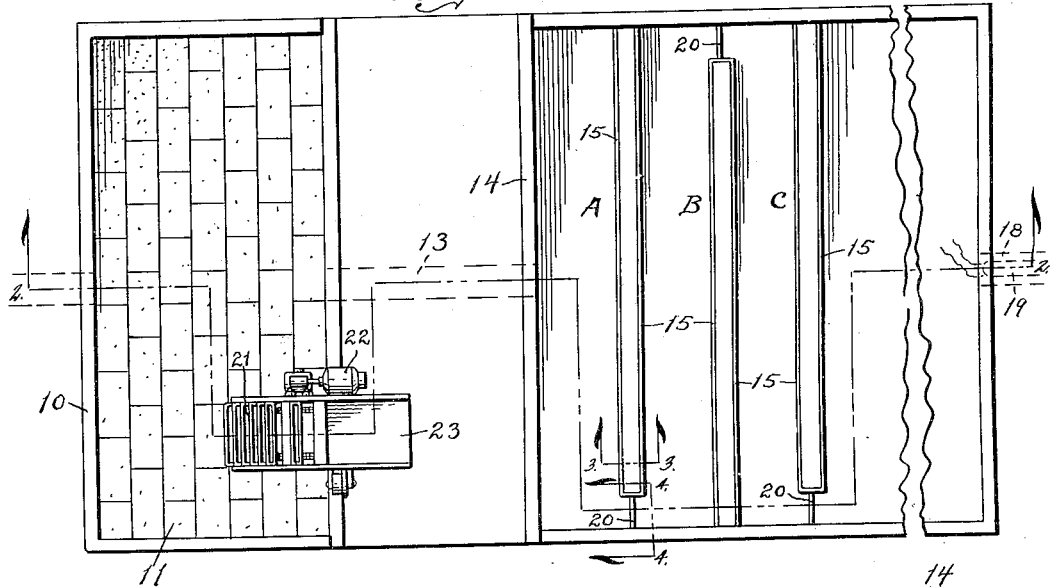
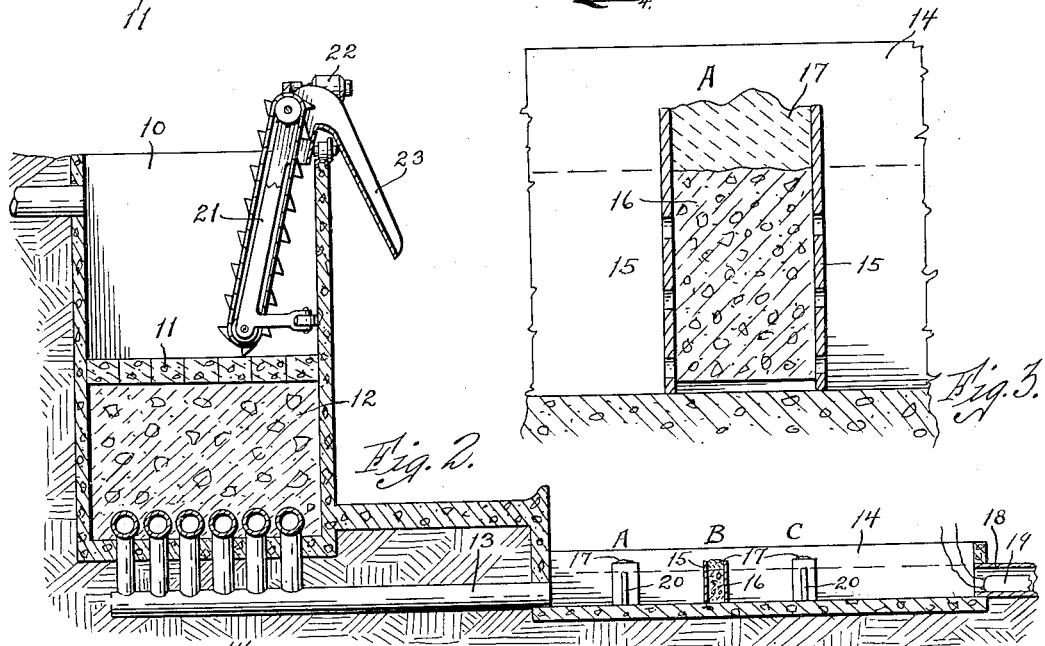
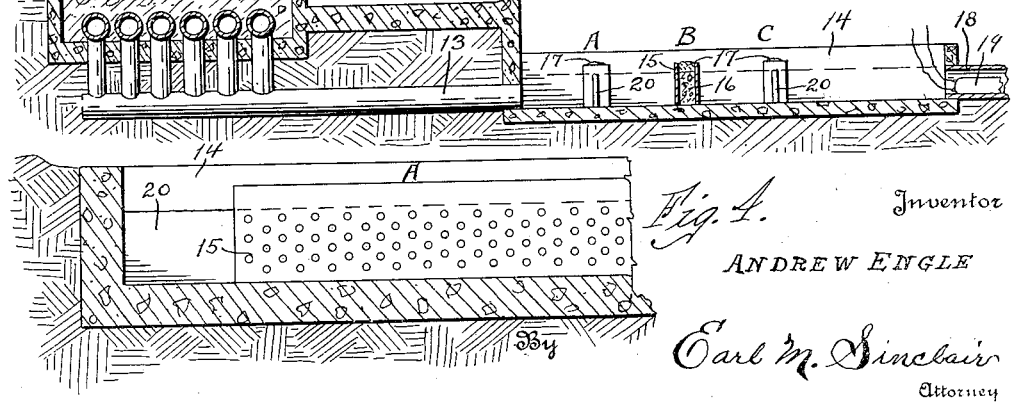

1,633,079

UNITED STATES PATENT OFFICE.

ANDREW ENGLE, OF NEWTON, IOWA, ASSIGNOR OF ONE-HALF TO JAMES MAINE, OF DES MOINES, IOWA.

PROCESS OF DISPOSING OF WASTE MATERIAL AND UTILIZING COMPONENTS THEREOF.

Application filed August 24, 1925. Serial No. 52,194.

The object of this invention is to provide an improved process and method of disposing of waste material such as night soil and kitchen garbage in a sanitary and at the same time an economical manner, and also of conserving and utilizing certain component parts of such waste matter.

A further object of the invention is to provide an inexpensive and sanitary method of disposing of waste matter such as night soil and garbage in such manner that portions thereof may be utilized as a fertilizer or as fuel.

My invention consists in the method and process hereinafter set forth, pointed out in the claims appended hereto, and designed to be carried out by using an apparatus such as is illustrated in the accompanying drawing in which—

Fig. 1 is a plan view of the complete apparatus, a portion being broken away to economize space.

Fig. 2 is a section on the line 2—2 of Fig. 1.

Fig. 3 is a cross-section of one of the filtering beds on the line 3—3 of Fig. 1.

Fig. 4 is a detail sectional elevation on the line 4—4 of Fig. 1.

It is yearly becoming an increasingly difficult and apparently hopeless problem for large cities to dispose of their sewage and garbage. Old methods have become practically impossible because of large congestion of population and the corresponding increase in the amount of such waste products, the pollution of streams and other bodies of water, and the unsanitary and unhealthful conditions attendant upon such methods, as well as the increasing cost of carrying them out, and the further necessity of utilizing all tillable land and also of conserving and fostering the production of fish and other sea food whose existence is threatened by the present methods.

I am convinced not only that these waste products contain in themselves component parts and elements which are most valuable as fertilizing agencies when applied to our soil, but also that such waste products and materials may be so treated that they may become an asset rather than a liability to any community. The problems above referred to may be solved in a manner which will be beneficial to the community by providing a sanitary and economical method of disposing of the waste matter and at the same time producing a valuable commodity therefrom.

More specifically, my improved process consists in depositing waste matter such as sewage, night soil, kitchen garbage and the like in a suitable container such as a tank of concrete or a similar structure; permitting the waste matter to remain in such container until the bacteria therein have started and carried on to a considerable extent the production of nitrates; permitting the liquid portions of the waste matter meanwhile to drain from the solid parts, such liquid portions passing to a receptacle which is open, in part at least, to atmosphere and sunlight; causing the liquid parts to pass through successive filtering beds wherein the bacteria and nitrates may pass by capillary action to media provided for their reception; and killing the bacteria by the action of atmospheric air, sunlight, heat or ultra-violet rays, or a combination of such agencies. The remaining liquids may be further clarified and filtered, and safely deposited in a body of water; and the filtering material in the filter beds, as well as the bacteria and nitrate receiving media, are also removed and utilized as fertilizers.

Any suitable means may be provided for carrying out this process, such for instance as is illustrated in the accompanying drawing and described and claimed in my companion application filed August 24, 1925, Serial Number 52,196.

I have found it advantageous to first deposit the waste materials in a concrete tank 10 having a false bottom 11 of porous material such as soft brick with an underlying layer 12 of filtering material such as sand and gravel. The false bottom retains the solid portions but permits the liquid portions to seep through to the filtering bed where they are purified to a certain extent, and permitted to pass off through conduits 13 to an open receptacle 14. In this receptacle may be arranged a succession of filtering devices A, B and C composed of double perforated walls 15 between which the material 16 for filtering, such as sand and gravel, is placed, such filtering material being overlaid by a medium 17 for the bacteria such as clay or loam. The bacteria and nitrates rise through the filtering material 16 by capillary action to the receiving media 17 in which they are harbored and the bacteria permitted to continue their nitrifying action with some protection against excessive subjection to light and air. A portion of the bacteria and nitrates also are retained in the filtering material, the amounts however decreasing as the liquid passes through successive filtering beds. In this manner the bacteria and nitrates are collected and retained in suitable media or vehicles, including the clay or loam and the filtering sand, which may be removed from time to time and spread upon the soil for fertilizing purposes. In carrying out this process, cultures of nitrifying bacteria may be added to the contents of the tank, or dependence may be placed upon the natural occurrence of these bacteria, which usually are present in sufficient quantities in the waste matter to accomplish nitrification. The sediment in the liquid is gradually removed by the successive filtering, as well as the bacteria by the process described, and in time the liquid is rendered pure and clear. The bacteria are also killed as the process continues, by the combined action of air and sunlight in the open container; and any which remain may be killed by the application of heat or of ultra-violet rays. The heat may be applied by electrical means, or otherwise, in a remote portion of the receptacle or after the liquid has been drawn therefrom; and the ultra-violet rays may be applied by inserting in the discharge pipe 18 a tube or electrode 19 capable of giving off such rays into the liquid in a suitable location. The passage of liquid through the receptacle 14 and into contact with the successive filtering beds may be delayed by making each bed slightly shorter than the receptacle and employing an imperforate partition 20 to bridge the space between one end of each filtering bed and the adjacent wall of the receptacle as clearly shown in Figures 1 and 4. The position of successive filtering beds A, B, C and the like may be staggered in the receptacle so that the successive partitions 20 are located at opposite ends of the receptacle and the liquid is required to follow a sinuous course in passing between successive filtering beds. It will be noted that the partitions 20 are of less height than the walls of the filtering beds and that some of the liquid will flow over said partitions when the level of liquid in the receptacle reaches a given height, although other portions of the liquid will filter through the walls and filtering material of the beds.

The liquid which is finally drawn off will be found to be free of bacteria and germs of all kinds and so purified that it may safely be deposited in a stream or other body of water without any injurious effects to the health of the inhabitants, or of the life in the body of water.

The solid parts which remain in the receiving tank 10 preferably are removed almost immediately and taken away, after which they may be treated by any well known process for producing either fertilizer or fuel. An elevating device 21, driven by a motor 22, and having a discharge spout 23, may be employed in the tank 10, for removing the solid matter therefrom.

I believe that it will be practicable to follow the plan of comminuting, chopping or shredding all kitchen and similar garbage and inserting it into the sewers, by which it will be carried, along with the sewage and night soil, to the place for carrying out my process above described. This will save the labor of separate collection and disposition of garbage and will also introduce into the materials treated, valuable elements which may be utilized for fertilizing purposes.

I claim as my invention—

1. A process of disposing of waste materials such as sewage, night soil, garbage and the like, which consists in separating the liquid from the solid portions thereof, filtering the liquid portions, permitting said liquid portions to be subjected to the action of nitrate-producing bacteria, destroying the bacteria, and again filtering such liquid portions.

2. A process of disposing of waste materials such as sewage, night soil, garbage and the like and utilizing components thereof, which consists in separating the liquid portions from the solid portions, passing the liquid portions through successive filtering beds associated with bacteria harboring media, destroying the bacteria, and drawing off the liquid portions for deposit in a suitable place.

3. A process of disposing of waste materials such as sewage, night soil, garbage and the like and utilizing components thereof, which consists in depositing said waste materials in a tank having a filtering material in its bottom and a substantially porous false bottom superposed thereon through which liquid portions are adapted to pass to the filtering material, drawing the liquid portions from the bottom of said tank, causing such liquid portions to pass through a receptacle equipped with a plurality of partitions each embodying filtering beds with bacteria harboring media superposed thereon, during which passage the liquid is filtered and subjected to the action of nitrate-producing bacteria, destroying the bacteria, and drawing the liquid from said receptacle for deposit in a suitable place.

4. A process for disposing of waste materials such as sewage, night soil, garbage and the like and utilizing components thereof, which consists in separating the liquid from the solid portions of said waste material, causing such liquid portions to pass through an open receptacle provided with a plurality of partitions each embodying filtering material with bacteria harboring media superposed thereon and each exposed to atmospheric air and sunlight, during which passage the liquid is subjected to the action of nitrate-producing bacteria and successively filtered, destroying the bacteria, drawing off the liquid for deposit in a suitable place, and removing the filtering material and the bacteria-harboring media and employing them as fertilizing agents.

Signed at Des Moines, in the county of Polk and State of Iowa, this 15th day of August, 1925.

ANDREW ENGLE.